(12) United States Patent
Farthing et al.

(10) Patent No.: US 12,352,649 B2
(45) Date of Patent: Jul. 8, 2025

(54) SENSING TENSION IN A ROPE

(71) Applicant: ADVANTEC INTERNATIONAL LIMITED, Devon (GB)

(72) Inventors: Peter Farthing, Devon (GB); Richard Day, Martock (GB)

(73) Assignee: ADVANTEC INTERNATIONAL LIMITED, Devon (GB)

( * ) Notice: Subject to any disclaimer, the term of this patent is extended or adjusted under 35 U.S.C. 154(b) by 0 days.

(21) Appl. No.: 18/834,906

(22) PCT Filed: Feb. 3, 2023

(86) PCT No.: PCT/EP2023/052678
§ 371 (c)(1),
(2) Date: Jul. 31, 2024

(87) PCT Pub. No.: WO2024/022621
PCT Pub. Date: Feb. 1, 2024

(65) Prior Publication Data
US 2024/0418588 A1 Dec. 19, 2024

(30) Foreign Application Priority Data

Jul. 24, 2022 (GB) .................................. 2210805

(51) Int. Cl.
*G01L 5/101* (2020.01)
*G01L 5/00* (2006.01)
*G01L 5/04* (2006.01)

(52) U.S. Cl.
CPC ............ *G01L 5/101* (2013.01); *G01L 5/0004* (2013.01); *G01L 5/0033* (2013.01); *G01L 5/04* (2013.01)

(58) Field of Classification Search
CPC ......... G01L 5/101; G01L 5/04; G01L 5/0004; G01L 5/0033
(Continued)

(56) References Cited

U.S. PATENT DOCUMENTS

2016/0223445 A1* 8/2016 Campbell ................. G01L 5/04
2020/0173875 A1* 6/2020 Campbell ............... G01L 5/101

FOREIGN PATENT DOCUMENTS

CN 105244683 A * 1/2016 ............. G01V 1/202
CN 113774806 A * 12/2021 ............. E01D 11/02
(Continued)

OTHER PUBLICATIONS

CN113774806 Dec. 10, 2021 (Year: 2021).*
(Continued)

*Primary Examiner* — Peter J Macchiarolo
*Assistant Examiner* — Monica S Young
(74) *Attorney, Agent, or Firm* — Ware, Fressola, Maguire & Barber LLP

(57) ABSTRACT

A sensor assembly (106) for sensing tension in a rope (102) comprises an arrangement of a housing (301) and a force sensor (302) located within an interior (305) of the housing (301) to provide for repeatable, accurate data to be obtained. The force sensor (302) is non-fixedly held in contact with an inner walling (306) of the interior (305) of the housing (301), in the region of a resiliently deflectable portion (307) of the housing (301), for sensing a mechanical force applied to the resiliently deflectable portion (307). A method of sensing tension in a rope (102) comprises locating the sensor assembly (106) within the rope (102) and operating the sensor assembly (106) to sense tension in the rope (102).

17 Claims, 8 Drawing Sheets

(58) Field of Classification Search
USPC .......................................................... 73/768
See application file for complete search history.

(56) References Cited

FOREIGN PATENT DOCUMENTS

| | | | | | |
|---|---|---|---|---|---|
| CN | 115515847 | A | * | 12/2022 | ............ B62J 45/411 |
| SU | 1481606 | A1 | * | 5/1989 | |
| WO | WO-2019076522 | A1 | * | 4/2019 | ............ B63B 21/00 |
| WO | WO-2019081712 | A1 | * | 5/2019 | ............... G01B 7/18 |
| WO | WO-2020249976 | A1 | * | 12/2020 | ............ D07B 1/145 |
| WO | WO-2022090001 | A1 | * | 5/2022 | ............ A61B 34/71 |

OTHER PUBLICATIONS

WO2019081712. May 2, 2019 (Year: 2019).*
"Lightweight Internal Device to Measure Tension in Hollow-Braided Cordage"; Tech Briefs, Jul. 1, 2016, 6 pages.
International Search Report and Written Opinion, Application No. PCT/EP2023/052678, mailed May 30, 2023, 12 pages.
UKIPO Search Report, Application No. GB2210805.4, dated Jan. 20, 2023, 2 pages.

* cited by examiner

SENSING TENSION IN A ROPE

FIELD OF THE INVENTION

The present application relates to sensing tension in a rope, and more particularly to a sensor assembly for sensing tension in a rope and to a method of sensing tension in a rope.

BACKGROUND OF THE INVENTION

Loading of a rope, such as a mooring line used for mooring a boat or a rope used for towing or lifting, and in particular the overloading of a rope, may gradually fatigue and damage the rope. This leads to the risk of the rope snapping in service, risking damage to equipment and injury to personnel in the vicinity. It is therefore desirable to determine the load exerted on a rope. Knowledge of the load history of a rope may allow an operator to infer the condition of the rope and so the remaining service-life of the rope without the requirement for manual inspection of the rope. Further, determination in real-time of the load on a rope during use may allow for an operator to take action to control the load exerted on the rope to reduce the occurrence of overloading of the rope.

International Patent Publication No. WO 2020/249976 A1 discloses a sensor assembly for sensing tension in a rope that comprises: a housing, a force sensor for sensing mechanical force applied to the housing located outside the housing, and a controller for controlling the force sensor located inside the housing.

SUMMARY OF THE INVENTION

An objective of the present disclosure is to provide an apparatus and method for sensing tension in a rope, i.e., a line comprising a plurality of intertwined, e.g., twisted, plaited, or braided, strands of material, for example, strands of cotton, sisal, nylon, polyester, polyethylene, Kevlar®, Dyneema®, or other material suitable for use in constructing a rope. It is a particular objective to provide a sensor assembly that can be located within a rope to sense tension in the rope during use.

According to a first aspect there is provided a sensor assembly for sensing tension in a rope, the sensor assembly comprising: a housing, the housing defining an interior comprising inner walling, and in which at least a portion of the housing is resiliently deflectable, a force sensor for sensing a mechanical force applied to a resiliently deflectable portion of the housing, the force sensor located within the interior of the housing and non-fixedly held in contact with the inner walling in the region of the resiliently deflectable portion of the housing, and a controller for controlling the force sensor.

The rope may be used in any of a variety of different applications, for example for tethering an object, mooring a boat, towing, or lifting.

In a preferred example, the force sensor is resiliently biased into contact with the inner walling by an adjustable chassis, the adjustable chassis located within the interior of the housing.

In an example, the adjustable chassis is configurable between extended and retracted conditions, and a span of the adjustable chassis, in a radial direction of the housing, is greater when in the extended condition than when in the retracted position, the retracted position allowing for insertion into the interior of the housing and the extended condition allowing for retention of the supported force sensor against the inner walling of the interior of the housing. The adjustable chassis may comprise at least one movable engagement member that is resiliently biased towards an extended position for urging the force sensor into contact with the inner walling.

In an example, the controller is located within the interior of the housing.

In a preferred example, the force sensor comprises a strain gauge. In an example, the strain gauge extends in a circumferential direction of the housing.

The strain gauge may extend around at least a quarter of, at least a half of, or at least three-quarters of an inner circumference of the interior of the housing.

In an example, the sensor assembly further comprises a second force sensor, the controller for further controlling the second force sensor. The second force sensor may comprise a strain gauge.

In an example, the sensor assembly further comprises a gyroscope sensor for measuring angular deviation from a reference line.

The gyroscope may be a multi-axis gyroscope sensor, which may be a 6-axis gyroscope sensor.

In an example, the sensor assembly further comprises an antenna, the antenna located to extend within the interior of the housing. The sensor assembly may be configured for wireless communication with a remote computer. Wireless communication may be via any suitable wireless telecommunication network, for example, via Wifi, Bluetooth, or GPRS (General Packet Radio Service).

The housing may comprise a plastics material. The housing may comprise a metal material.

In an example, the housing comprises a main body and a removable end cap. The main body and removable end cap may be made from different materials.

In a preferred example, the housing is elongate and has a generally ellipsoidal shape, designed for smooth transition of the rope path around it.

With the force sensor being located within the interior of the housing and non-fixedly held in contact with the inner walling in the region of the resiliently deflectable portion of the housing, a force applied on the exterior of the housing that causes movement of the resiliently deflectable portion causes an associated detectable change in the force sensor. With the force sensor received within the interior of the housing, it is physically protected by the housing against deterioration arising from exposure to potentially harmful matter in the surrounding environment.

According to a second aspect there is provided a tethering assembly for tethering an object, comprising: a rope, and a sensor assembly according to the first aspect, the sensor assembly located within the rope for sensing mechanical force applied to the housing by the rope.

The tethering assembly may be used for the purpose of, for example, mooring a boat, towing, or lifting.

According to a third aspect there is provided a method of sensing tension in a rope, comprising: obtaining a sensor assembly according to the first aspect, locating the sensor assembly within the rope, and operating the sensor assembly to sense tension in the rope.

The method may further comprise obtaining a second sensor assembly according to the first aspect, locating the second sensor assembly within a second rope, and operating the second sensor assembly to sense tension in the second rope.

A plurality of the sensor assemblies may be utilised in an Internet of Things (IoT) network.

Further particular and preferred aspects of the invention are set out in the accompanying dependent claims.

BRIEF DESCRIPTION OF THE DRAWINGS

The present invention will now be more particularly described, with reference to the accompanying drawings, in which.

DESCRIPTION

Illustrative embodiments and examples are described below in sufficient detail to enable those of ordinary skill in the art to embody and implement the apparatus described herein. It is to be understood that embodiments and examples can be provided in many alternate forms and the invention should not be construed as limited to the embodiments and examples set forth herein but by the scope of the appended claims.

Unless otherwise defined, all terms (including technical and scientific terms) used herein are to be interpreted as is customary in the art. In addition, features referred to herein in the singular can number one or more, unless the context clearly indicates otherwise. Similarly, the terms "comprises", "comprising", "includes", "including", "has" and/or "having" when used herein, specify the presence of the stated feature or features and do not preclude the presence or addition of one or more other features, unless the context clearly indicates otherwise. In the following description, all orientational terms, such as upper, lower, radially and axially, are used in relation to the drawings and should not be interpreted as limiting on the invention, unless the context clearly indicates otherwise. The drawings are not necessarily drawn to scale, and in some instances the drawings may have been exaggerated or simplified for illustrative purposes only.

Figure 1:
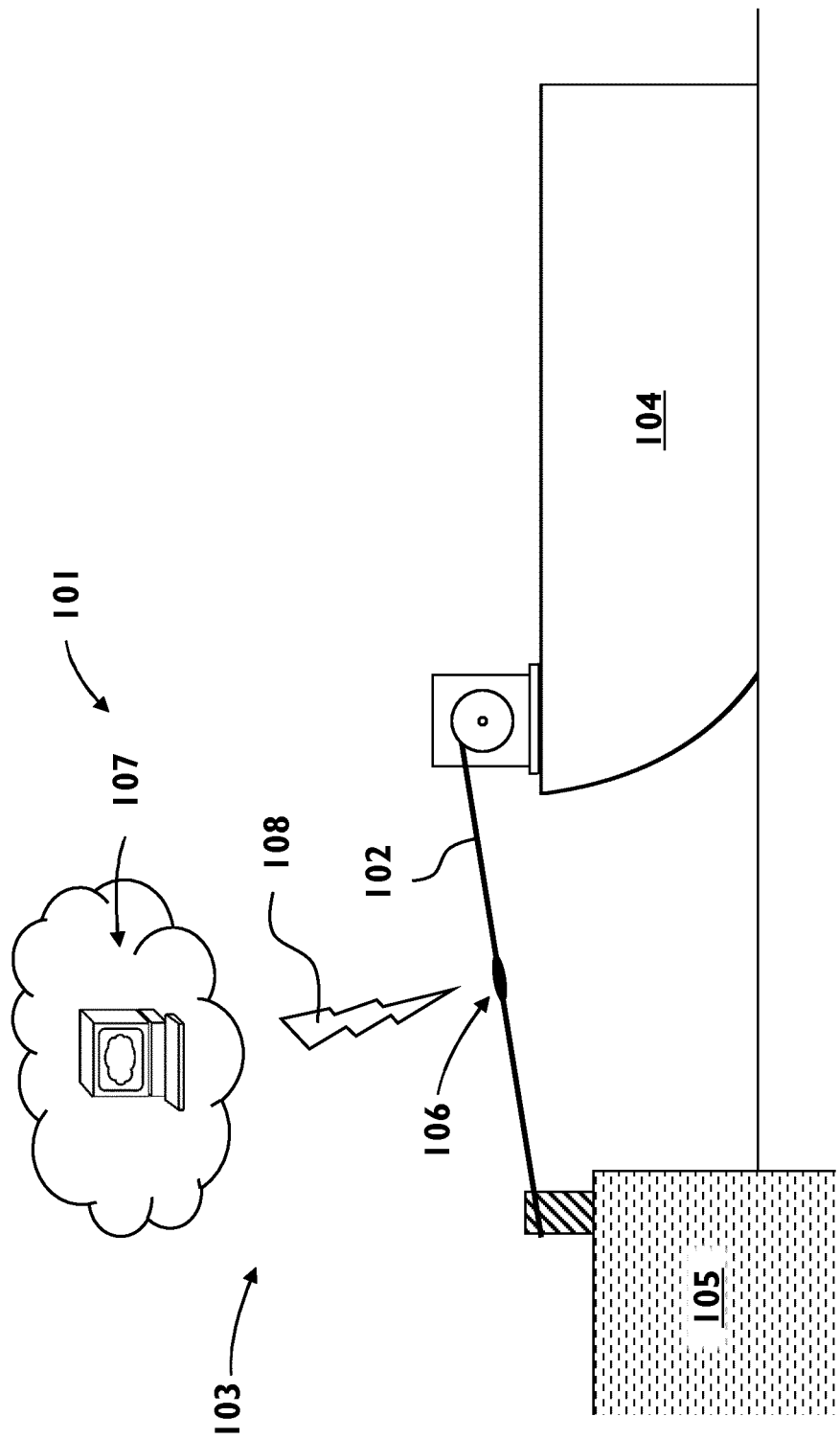
FIG. 1 illustrates a tethering assembly comprising a rope for tethering an object and an example sensor system for sensing tension in the rope.

A tethering assembly 101 is illustrated in FIG. 1. The tethering assembly 101 comprises a rope 102 for tethering an object, and a sensor system, indicated generally at 103, for sensing tension in the rope 102, the sensor system 103 according to a first example. In the shown scenario, the rope 102 of the tethering assembly 101 is deployed for mooring a boat 104 to a dock 105. It is to be appreciated however that the rope 102 of tethering assembly 101 may be deployed differently, for example, for towing or lifting. Use of the tethering assembly 101 is therefore in no way limited to the specific application illustrated in this Figure.

The rope 102 may be made using any suitable material or materials and any suitable manner of construction. In this illustrated example, rope 102 comprises a plurality of intertwined strands of polyester forming a flexible line.

Sensor system 103 comprises a sensor assembly, indicated generally at 106, for measuring tension in the rope 102. As indicated, the sensor assembly 106 is located within the rope 102. Sensor system 103 further comprises a remote computer 107, in communication with the sensor assembly 106 to facilitate data exchange therebetween. As indicated at 108, the remote computer 107 is in communication with the sensor assembly 106 via a wireless telecommunication network. The wireless telecommunication network may operate in accordance with any suitable communications protocol. Wireless communication may be, for example, via Wifi, Bluetooth, or GPRS (General Packet Radio Service).

Figure 2:
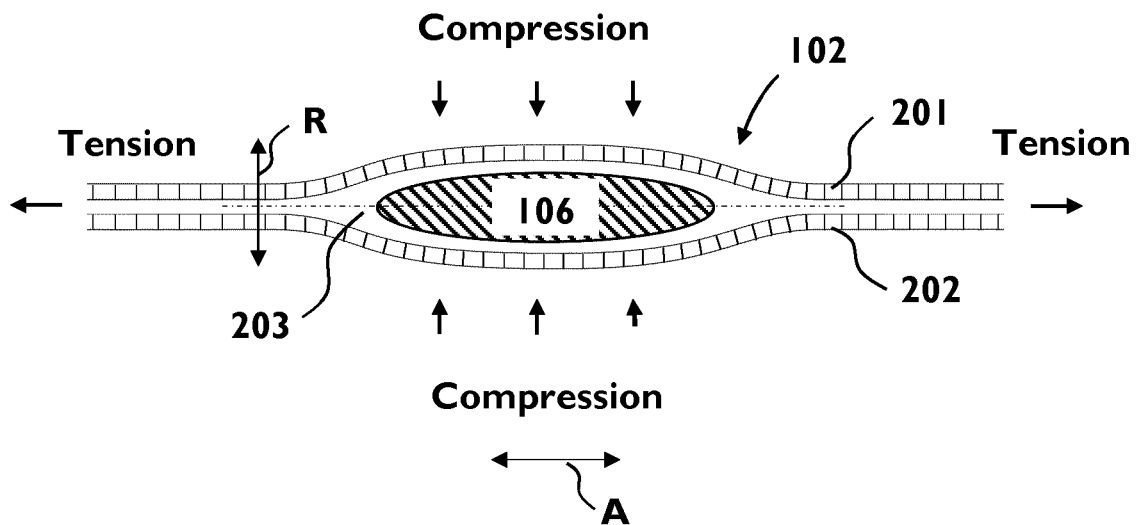
FIG. 2 illustrates a sensor assembly of the example sensor system of FIG. 1 located within the rope of the tethering assembly of FIG. 1.

In FIG. 2, radial R, and axial A, directions of the rope 102 are indicated, and the sensor assembly 106 is shown located within the rope 102, approximately centrally with respect to the width of the rope 102, which extends in the radial direction R. The sensor assembly 106 is thus located between strands of the rope 102, such as strands 201, 202, and is retained in place in use within the rope 102 by the strands 201, 202.

As illustrated in this Figure, the strands 201, 202 of the rope 102 are displaced radially outwardly from a centreline 203 of the rope 102, which extends along the length of the rope 102 in the axial direction A, by the location of the sensor assembly 106. Tension exerted along the length of the rope causes the strands 201, 202 of the rope to be drawn radially inwardly against the sensor assembly 106, thereby exerting a compressive, i.e., a radially inward, force on the sensor assembly 106. As will be described further, tension on the rope 102 may be inferred by the sensor assembly 106 through measurement of the compressive force exerted on the sensor assembly 106 by the strands 201, 202 of the rope 102.

Figure 3:
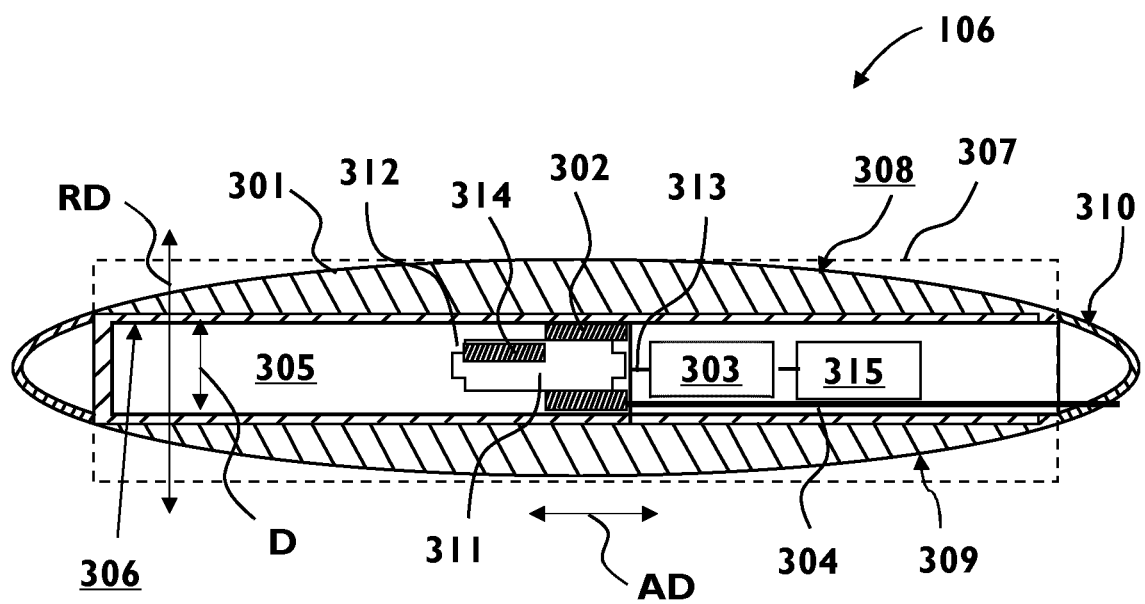
FIG. 3 shows schematically a side cross-sectional view of the sensor assembly of FIGS. 1 & 2.

With reference now to FIG. 3, the sensor assembly 106 comprises a housing 301, at least one force sensor 302, a controller, indicated generally at 303, for controlling the force sensor 302, and an antenna 304. As indicated, housing 301 defines an interior 305 having inner walling 306. In this specific example, the housing 301 is elongate and the interior 305 is generally cylindrical with a length in the axial direction AD of the housing 301 and a diameter D in the radial direction RD of the housing 301.

As will be described further, at least a portion of the housing 301 is a resiliently deflectable portion, indicated at 307. The shown resiliently deflectable portion 307 extends between the inner walling 306 of the interior 305 of the housing and exterior walling 308 of the housing 301.

In this illustrated example, the housing 301 comprises a main body, indicated at 309, and at least one end closure element, such as end cap 310, that is releasably secured to the main body 309 and allows the interior 305 to be selectively accessed. End cap 310 may be detachably secured to the main body 309 by any suitable arrangement, for example a snap-fit arrangement or a screw thread arrangement. According to this specific example, the main body 309 defines the interior 305 and the comprises resiliently deflectable portion 307.

The force sensor 302 is located within the interior 305 of the housing 301. The force sensor 302 is non-fixedly held in contact with the inner walling 306 within the resiliently deflectable portion 307 of the housing 301. By "non-fixedly" it is meant that the force sensor 302 is not connected to the housing 301 but is instead supported in such a way that it abuts the housing 301. In this embodiment, the force sensor 302 is resiliently biased into contact with the inner walling 306 of the housing 301 by an adjustable chassis, indicated generally at 311, which is also located within the interior 305 of the housing 301.

According to the present example, the adjustable chassis 311 is configurable between extended and retracted conditions, a span (in the axial direction AD of the housing 301) of the adjustable chassis 311 being greater when in the extended condition than when in the retracted position, the retracted position allowing for insertion into the interior 305 of the housing 301 and the extended condition allowing for retention of the supported force sensor 302 against the inner walling 306 of the interior 305 of the housing 301. In this illustrated example, the adjustable chassis 311 comprises at least one movable engagement member, indicated at 313, that is resiliently biased towards an extended position, for urging the force sensor 302 into contact with the inner walling 306.

In an example, the adjustable chassis 311 is a spring clip that is squeezable from the extended condition into the retracted condition. Thus, a compressive force can be applied to the adjustable chassis 311 to move it into, and hold it in, the retracted condition, the adjustable chassis 311 can be slid into the interior 305 of the housing 301 and then the applied compressive force removed to allow the adjustable chassis 311 to move back into the extended condition. The adjustable chassis 311 may have any suitable form and may be made from any suitable material or materials, which may be resiliently deformable, for example in the manner of a rubber material, or resiliently deflectable, for example in the manner of a metal leaf spring, or resiliently compressible, for example in the manner of a plastic or metal coil spring.

In an example, the force sensor 302 is a strain gauge. A strain gauge may desirably be relatively mechanically robust and resistant to mechanical damage. As indicated, the strain gauge 302 is arranged to extend in a circumferential direction of the housing. The strain gauge 302 may extend around at least a quarter of, at least a half of, or at least three-quarters of, an inner circumference of the interior 305 of the housing 301. Arranging the strain gauge 302 to extend around a greater proportion of the inner circumference of the interior 305 of the housing 301 may desirably increase the responsiveness of the force sensor 302 to forces from a wider range of directions, and thereby improve the accuracy of the force sensing.

In the present example, the force sensor 302 is a strain gauge comprising a convoluted electrically conductive trace. As indicated, the strain gauge 302 is arranged and dimensioned for runs of the conductive trace to extend circumferentially around almost the full circumference of the inner walling 306 of the interior 305 of the housing 301. The strain gauge is thus operable to detect force applied to the housing 301 around the full circumferential extent of the strain gauge 302. With this arrangement, the strain gauge 302 may desirably be capable of accurately detecting forces applied to the housing 301 from a wide range of directions; in particular, from directions subtended by the circumferential extent of the strain gauge 302. A strain gauge force sensor is ideally suited to this application, as it may be readily conformed to the circumferential profile of the inner walling 306 of the interior 305 of the housing 301.

In contrast, it has been observed that, for example, force sensors, such as strain gauges, that are arranged to extend diametrically with respect to the housing may exhibit relatively highly directional force sensing characteristics, i.e., in this arrangement the responsiveness of the sensor to an applied force would vary significantly in dependence on the direction of application of the force. Thus, in this configuration multiple force sensors may be required to accurately sense forces from a range of different directions. The invention may thus provide improved force sensing.

According to the present example also, the strain gauge 302 is mounted on a spring-loaded adjustable chassis 310 that is functional to urge the supported strain gauge 302 into an abutting condition with the inner walling 306 of the interior 305 of the housing 301.

Functions of the housing 301 include protecting components located within the interior 305 while allowing a tension in the rope in which the sensor assembly 106 is located to be sensed by the force sensor 302 yet allowing a desired overall outer shape of the sensor assembly 106 to be approximately maintained in use.

It is thus an objective for the housing 30I to be sufficiently resiliently compressible to allow the sensor assembly 106 to function as intended but sufficiently rigid to prevent excessive deformation in use and maintain structural integrity. It is another objective for the housing 301 to protect internally housed components from the ingress of such potentially harmful matter as water, debris, and pollutants. It is a further objective for the overall outer shape of the sensor assembly 106 as provided by the housing 301 to be such that it: (a) facilitates convenient location of the sensor assembly within a rope; (b) minimises abrasion between the sensor assembly and the rope in use, thereby minimising damage to either the sensor assembly or the rope; and (c) supports retention within the rope during use and resists displacement within the rope and/or ejection from the rope in use.

Preferably, and in this illustrated example, the housing 301 has a generally prolate ellipsoidal shape, designed for smooth transition of the rope path around it.

The housing 301, which is intended to exhibit an appropriate degree of elastic deformability under an applied compressive load, may be made using any suitable material or materials and any suitable manner of construction. In an example, the housing 301 comprises a metal material. The metal may be aluminium, titanium, sprung stainless steel or any other suitable type of metal. In an example, the housing 301 comprises a plastic material. In an example, the main body 309 and end cap 310 are made from different materials.

As the strain gauge 302 is pushed against the cylindrical inner walling 306 of the interior 305 of the housing 301, radial deformation of the housing 301, as may be expected to occur in consequence of compressive, i.e., radially inward, forces applied to the sensor assembly 106 in use (by strands of the rope in which the sensor assembly is located when the rope is tensioned), will correspondingly deform the strain gauge 302, by stretching or compressing the conductive trace of the strain gauge 302. The electrical resistance of the conductive trace of the strain gauge may thereby be varied by compressive force applied to the housing 301 by strands of the rope in use. By measurement of the electrical resistance of the strain gauge 302, compared to a reference unloaded value, the compressive force exerted on the sensor assembly 106 by the strands of the rope may be measured, from which the tension along the length of the rope may be inferred.

Thus, in summary, with the force sensor 302 being located within the interior 305 of the housing 301 and non-fixedly held in contact with the inner walling 306 in the region of the resiliently deflectable portion 307 of the housing 301, a force applied on the exterior of the housing 301 that causes movement of the resiliently deflectable portion 307 causes an associated detectable change in the force sensor 302. Further, with the force sensor 302 being received inside the housing 301, it is physically protected against deterioration arising from exposure to potentially harmful matter as, for example, water, debris, and pollutants.

Arranging the strain gauge 302 inside the housing 301 and in non-fixed contact with inner walling 306 of the housing 301, as described above, advantageously functions to provide for repeatable, accurate data to be obtained. In this example, controller 303 is also located within the interior 305 of the housing 301. The controller 303 is connected to the at least one force sensor 302, for controlling the taking of measurements of force exerted thereon.

As shown, in this example, antenna 304 is located to extend within the interior 305 of the housing 301 and to project through the housing 301 to the exterior of the housing 301. In this example, the antenna 304 extends through the end cap 309 to the outside of the housing 301. As shown, in the present example, the majority of the antenna 304 is located within the housing 301.

In an example, the end cap 309 comprises a plastics material. The use of plastic in the end cap can beneficially serve to physically protect the antenna 304 and at the same time reduce interference with reception/transmission of radio-frequency (RF) signals by the antenna 304, in turn improving the reliability of RF transmission/reception. The plastic may be polyether ether ketone (PEEK), another suitable thermoplastic polymer or any other suitable type of plastic.

In the specific illustrated example, antenna 304 is a monopole antenna, and is arranged such that the conductor of the antenna 205 runs in length in the axial direction AD of the housing 301. In a similar manner to strain gauge 302, antenna 304 is connected to the controller 303 by conductors, indicated generally at 312. The controller 303 may comprise a radio-frequency receiver/transmitter/transceiver coupled to the antenna 304. In an example, the antenna is supported by the adjustable chassis 311 that force sensor 302 is supported by.

Preferably, and in this illustrated example, the sensor assembly 106 comprises a second force sensor 314. According to the illustrated arrangement, second force sensor 314 is a strain gauge. The second strain gauge 314 is also located inside the housing 301. In the present example, the second strain gauge 314 is supported within the interior 305 of the housing 301 differently from the strain gauge 302; whereas the strain gauge 302 is supported in contact with a surface of the housing 301 (more specifically, the inner walling 306 of the interior 305), the second strain gauge 314 is supported to so that more of its surface area is exposed to air.

In the present example, second strain gauge 314 is utilised to monitor differential temperatures within the housing 301, from which an indication of the core temperature of the rope can be derived. In an example, an indication of the temperature within the housing 301 is derived from both the strain gauge 302 and the second strain gauge 314 and the difference between these two temperature indications used in further calculation to derive the indication of the core rope temperature.

Preferably, and in this illustrated example, the sensor assembly 106 comprises a gyroscope sensor 315, for measuring angular deviation from a reference line. In the present example, the gyroscope sensor 315 is utilised to measure degrees of angle with respect to a reference horizontal line, formed when the rope is in use between two objects. Such measurements can beneficially be used in assessing a condition of the rope, in particular regarding the structural life of the rope. It is to be appreciated that towing strength of a rope is influenced by how it is used and whether it is used consistently within tolerances specified by the rope manufacturer. In an example, the gyroscope sensor 315 is a multi-axis gyroscope sensor. In a specific example, the gyroscope sensor 315 is a 6-axis gyroscope sensor.

Figure 4:
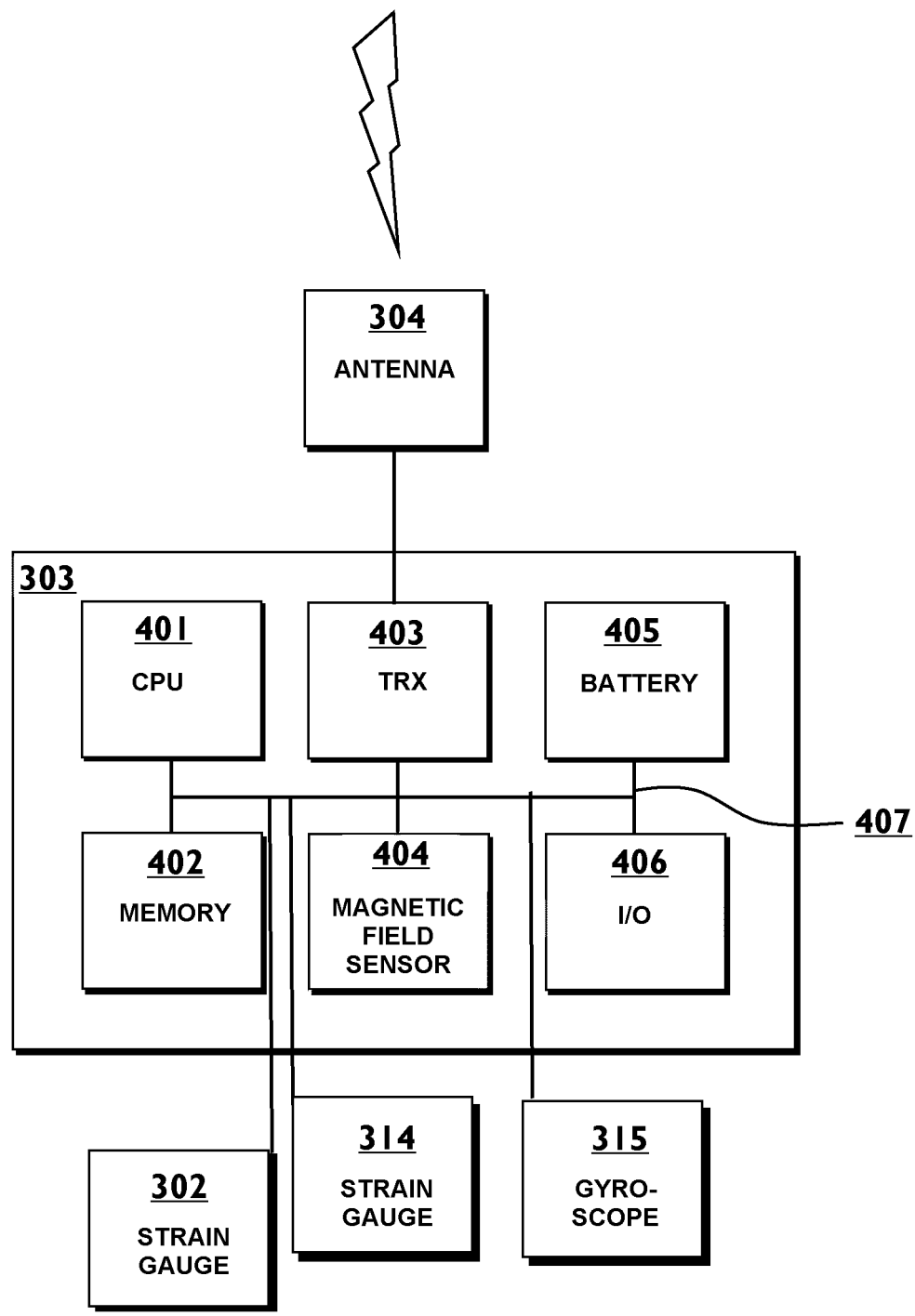
FIG. 4 shows schematically computing hardware of the sensor assembly of FIGS. 1 to 3.

Referring next to FIG. 4, the controller 303 comprises central processing unit 401, memory 402, transceiver 403, magnetic field sensor 404, battery 405, and input/output interface 406.

Central processing unit 401 is configured for execution of commands received from the remote computer 107, for processing of sensor data received from the strain gauge 302, and in this specific example from second strain gauge 314 and gyroscope sensor 315, and for overall control of the other hardware of the controller, including transceiver 403. Memory 402 is configured as read/write memory for non-volatile storage of sensor data received from strain gauge 302. Transceiver 403 is provided for wireless communication with the remote computer 107 via the wireless telecommunication network. Magnetic field sensor 404 is configured to act as a switch for controlling the operation of the central processing unit 401 and is operable to cause the controller 303 to switch from a powered-down state to a powered-up state in response to an applied magnetic field, as will be described in further detail with reference to FIGS. 7 and 8.

In the illustrated example, the magnetic field sensor 404 comprises a microelectromechanical systems (MEMS) sensor. Battery 405 is provided for supplying electrical power to electrical consumers of the controller 303, such as the central processing unit 401 and the transceiver 403, and for supplying electrical power to the strain gauge 302. The input/output interface 406 is operable for upload and download of data from memory 402, and for charging of battery 405.

Preferably, and in this present example, the controller 303 is configured such that data transfer and charging can be effected without requiring the interior 305 of the housing 301 to be accessed. The input/output interface 406 may also allow the connection of peripheral devices to the controller 303, for example via a Universal Serial Bus (USB) connection, a port for which may be provided within the end cap 310. The components 401 to 406 of the controller 303 are in communication via system bus 407.

Figure 5:
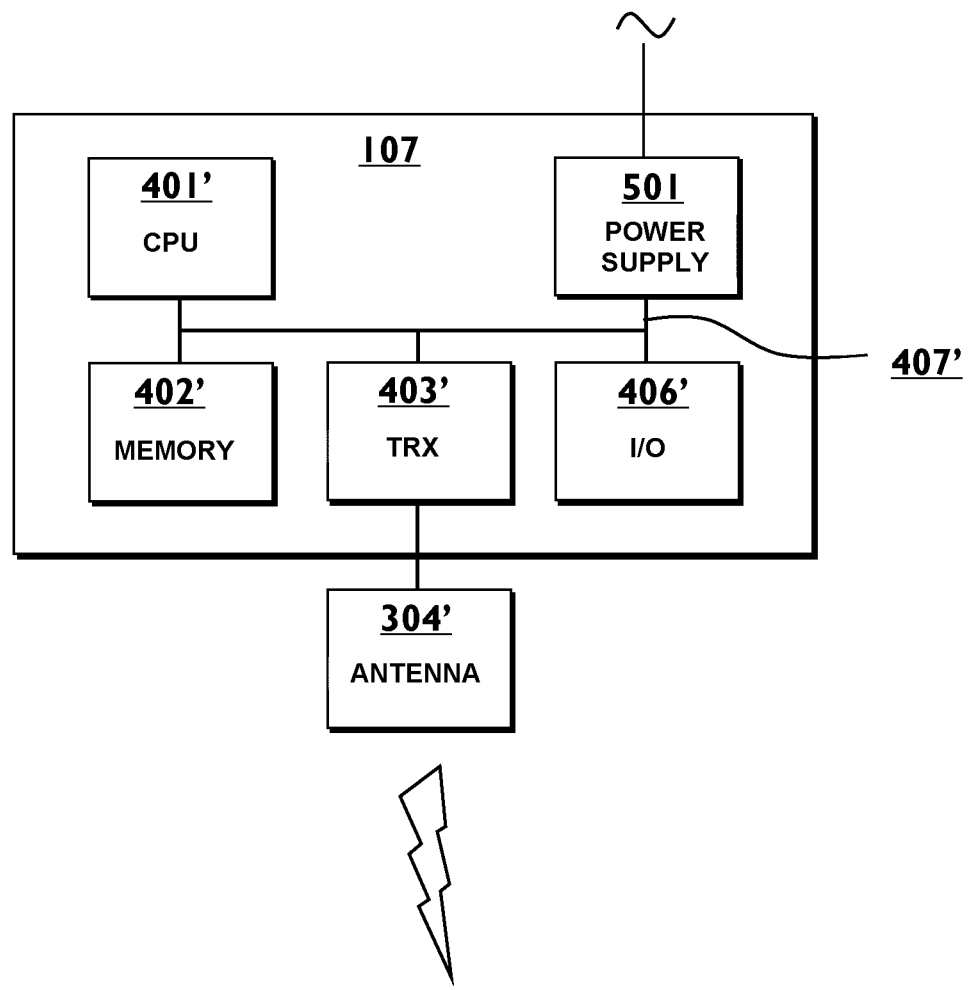
FIG. 5 shows schematically computing hardware of the remote computer of FIG. 1.

Referring next to FIG. 5, remote computer 107 comprises similar hardware components to controller 303, and like components are identified in the Figure by like reference numerals. Thus, similarly to controller 303, remote computer 107 comprises central processing unit 401', memory 402', transceiver 403', input/output interface 406', and system bus 407'. Unlike controller 303, remote computer 107 comprises a power supply 501 for connection to a source of mains electrical power, in place of the battery 405 of controller 303. Remote computer 107 communicates with controller 303 using transceiver 403' via the wireless communication network. Thus, remote computer 107 may issue commands to controller 303 to cause controller 303 to operate the strain gauge 302, and in this specific example, second strain gauge 314 and gyroscope sensor 315, to collect sensor data relating to tension in the rope 102, and to cause controller 303 to return the sensor data to the remote computer 107. Sensor data returned to the remote computer 107 may subsequently be processed by central processing unit 401', and/or output to an operator of the remote computer 107, for example, by outputting the processed sensor data in a visual format via an electronic display connected to input/output interface 406'.

Figure 6:
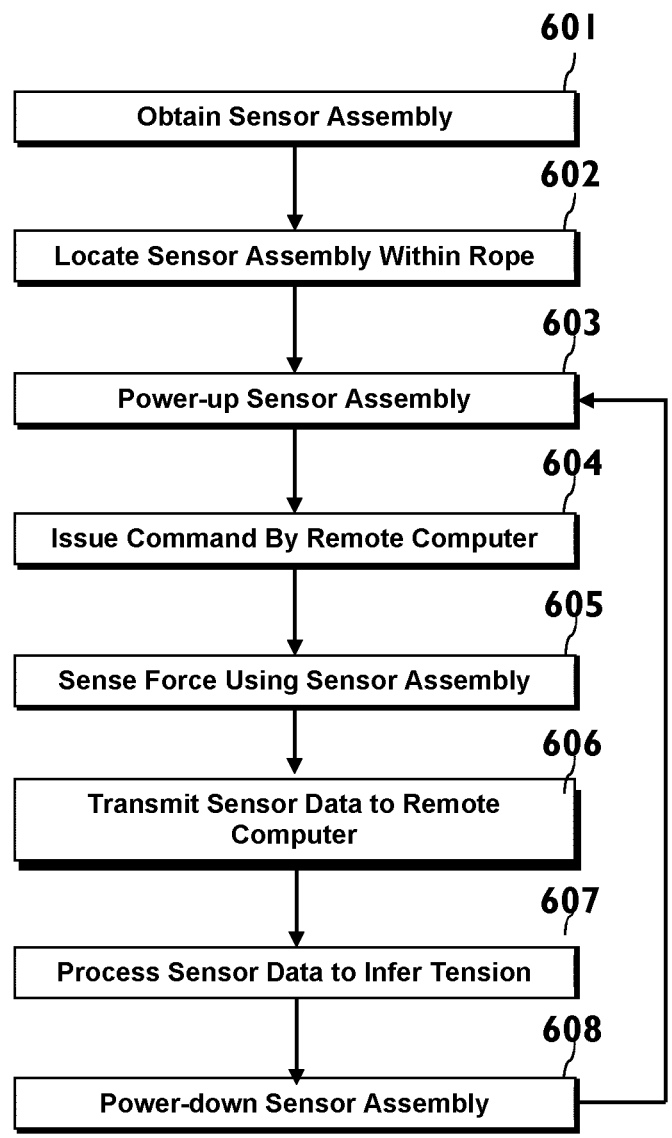
FIG. 6 shows steps in an example method for sensing tension in a rope using the sensor assembly.

Steps in a method of using the sensor system 103 disclosed herein to sense tension in a rope will now be described with reference to FIG. 6, which outlines eight stages.

At stage 601, a sensor assembly 106 as depicted in FIG. 3 is obtained.

At stage 602, the sensor assembly 106 is located within the rope for which tension is to be sensed, e.g., rope 102. For example, the sensor assembly may be manually manipulated into the rope by locally separating strands of the rope to create an opening and then inserting the sensor assembly into the opening so as to be retained between strands of the rope approximately centrally with respect to the width of the rope.

At stage 603, the sensor assembly is powered-up. In an example, the sensor assembly 106 is powered-up, i.e., turned on, by application of a local magnetic field to the sensor assembly 106 to excite the magnetic field sensor 404 and cause the magnetic field sensor 404 to switch the sensor assembly to an active state.

At stage 604, the remote computer 107 issues a command, via the wireless communication network, to cause the sensor assembly 106 to sense force exerted on the sensor assembly by the strands of the rope and return the sensor data to the remote computer. For example, the remote computer 107 may issue such a command in response to a human input via a human-machine interface connected to the input/output interface 406' of the remote computer. As an exemplary alternative, the command issued by the remote computer could be prompted by a computer program running on central processing unit 401' of remote computer 107.

At stage 605, in response to the command issued at stage 604, the controller 303 of the sensor assembly 106 passes an electrical current through the strain gauge 302 and measures the electrical resistance of the strain gauge. The controller 303 then performs preliminary processing of the sensor data, i.e., the electrical resistance data, using the central processing unit 401 of the controller. Data from other sensors, such as the second strain gauge 314 and the gyroscope sensor 3154 of the specific example described above, may similarly be obtained and then processed at this stage.

At stage 606, the controller 303 of the sensor assembly 106 transmits the sensor data obtained at stage 605 to the remote computer 107 via the wireless communication network.

At stage 607, the remote computer 107 further processes the sensor data returned by the sensor assembly 106 at stage 606 to infer the tension on the rope. The remote computer may, for example, output the sensor data to a human operator of the remote computer 107 in real-time, thereby allowing the operator to understand the tension in the rope in real time. Alternatively, and/or additionally, the remote computer 107 may store the processed sensor data in memory 402', to thereby record the load history of the rope for retrieval by an operator at a later time.

At stage 608, the sensor assembly 106 is powered-down to conserve the state of charge of battery 405 during a period of non-use. For example, the power-down operation could be performed in response to a command received from the remote computer 107 indicating an end of a force sensing session. As an exemplary alternative, the sensor assembly 106 could be internally programmed to power-down following a period of non-use exceeding a threshold period of time.

The powered-down state of the sensor assembly, entered at stage 608, could involve a partial shut-down of electrical consumers of the sensor assembly, such that the sensor assembly is placed in a low-power 'sleep' state, in which some components of the sensor assembly remain powered. For example, the powered-down state could involve powering-down the strain gauge 302 (and second strain gauge 314 and/or gyroscope sensor 315) whilst maintaining sufficient functionality of the central processing unit 401 and transceiver 403 to allow the sensor assembly to receive and act on future power-up commands issued by the remote computer 107 via the wireless communication network. Such a partially powered-down state has the advantage that battery consumption is reduced, whilst remote powering-on of the sensor assembly 106 by the remote computer 107 remains possible.

Alternatively, the powered-down state of the sensor assembly could involve a full power-down of all electrical consumers of the sensor assembly 106, including the central-processing unit 401 and the transceiver 403. Such a fully powered-down state has the advantage that power-consumption during periods of non-use of the sensor assembly is near-eliminated, and thus the operational life of the sensor assembly before recharging of the battery 405 is required may desirably be extended. A disadvantage however of a fully powered-down state of the sensor assembly 106 is that the sensor assembly may not be remotely powered-up by a command issued by remote computer 107 via the wireless communication network.

Figure 7:
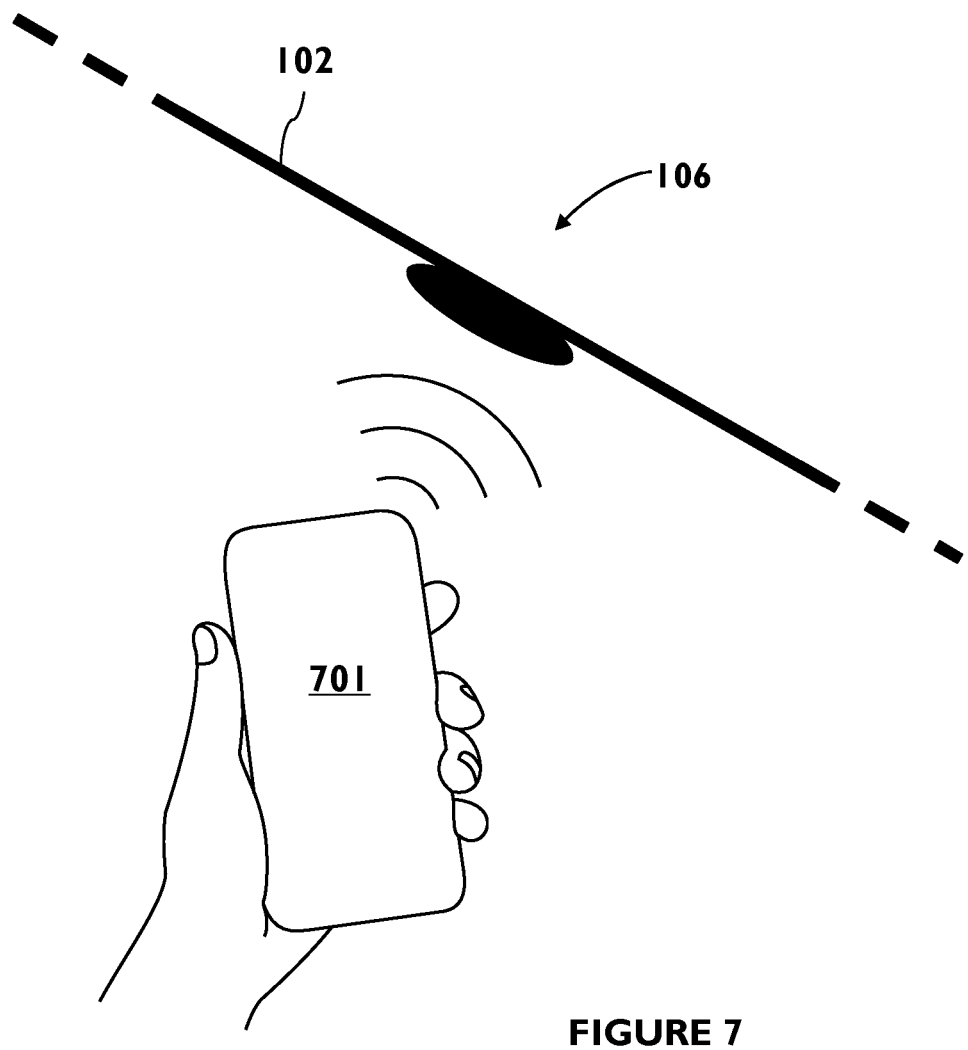
FIG. 7 shows illustratively a process of powering-on the sensor assembly.
Figure 8:
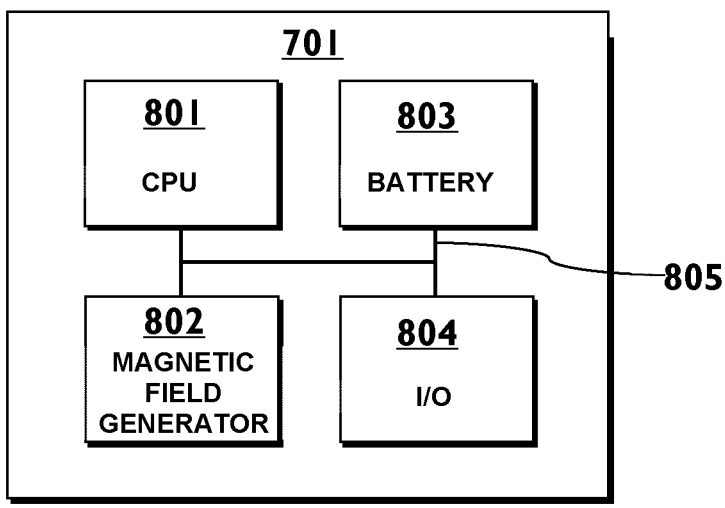
FIG. 8 shows schematically computing hardware.

Referring now to FIGS. 7 and 8, the sensor system 103 of this illustrated example further comprises a portable magnetic field generator device 701. Magnetic field generator device 701 is operable to generate a magnetic field, for example, in response to an operator pressing a button on the device 701. The magnetic field generator device 701 may thus be used for exciting the magnetic field sensor 404 of the controller 303 of sensor assembly 106, to thereby cause the controller 303 to switch from a powered-down, inoperative, state to a powered-up, operative, state. The magnetic field sensor device 404 of the controller 303 may be an electrically passive device, i.e. a device which does not require electrical power for operation. Thus, magnetic field sensor 404 of the controller 303 and magnetic field generator device 701 may be used for non-intrusively powering-up the sensor assembly even from a fully powered-down state of the sensor assembly.

Magnetic field generator device 701 comprises central processing unit 801, magnetic field generator 802, battery 803, input/output interface 804, and system bus 805. Central processing unit 801 is operable to control magnetic field generator 802. Magnetic field generator 802, which in the example is an electromagnet, is operable by an applied electric current to generate a magnetic field. Battery 803 is provided to supply electrical power to the central processing unit 801 and to the magnetic field generator 802. Input/output interface 804 is provided for connection of peripheral devices, for example, a human-machine interface, such as a trigger button. The components 801 to 804 of the device 701 communicate via system bus 805.

Referring in particular to FIG. 7, given the relatively short-range nature of a magnetic field, a method of powering-up the sensor assembly 106, located in-situ in rope 102, from a fully powered-down state, may involve an operative placing the magnetic field generator device 701 in the immediate vicinity of the sensor assembly 106, for example, within approximately 30 cm of the sensor assembly 106, and operating the magnetic field generator 802 to excite the magnetic field sensor 404 of the controller 303.

An alternative sensor assembly will now be described with reference to FIGS. 9 and 10. Sensor assembly 901 differs from sensor assembly 106 in that it is configured for wired communication with a computing device 902. The computing device 902 may be any suitable device, for example a tablet computer. An antenna is not required for wired communication and can therefore be omitted from the componentry and replaced with suitable wiring 903 that is operatively connected to the controller 303 and extends through the housing 301 to the exterior of the housing 902.

By way of concise explanation, in the illustrated example, instead of the arrangement of end cap 310 and antenna 304 extending therethrough as comprised by the sensor assembly 106, sensor assembly 901 comprises the arrangement of end cap 903 and wiring 904 extending therethrough. The wiring 903 may be provided with any suitable connector arrangement at one or both ends, for electrically connecting the controller 303 to the computer device 902. The end cap 903 may be removably secured to the main body 309 of the housing 301.

Sensor assembly 901 provides for real-time data transfer and charging and may be installed in a rope 102 as a permanent fixture. Such a permanent in situ monitoring aspect may be beneficial in any number of applications, including, but not limited to, use with floating offshore wind, solar and wave generating technologies, deep water moorings and any other permanently fixed asset where data and power are constantly required. It is to be appreciated that conversion of the sensor assembly 106 to be capable of wired communication and/or conversion of the sensor assembly 901 to be capable of wireless communication may be possible by the substitution of appropriate componentry. In another example, a sensor assembly (not shown) is configured for both wired and wireless communication with a computing device.

Figure 9:
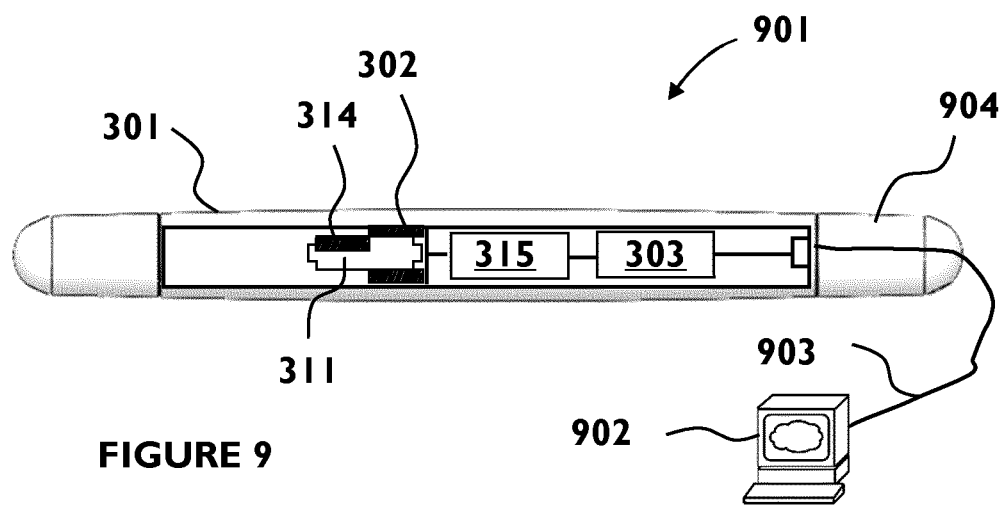
FIG. 9 shows schematically an alternative sensor assembly.
Figure 10:
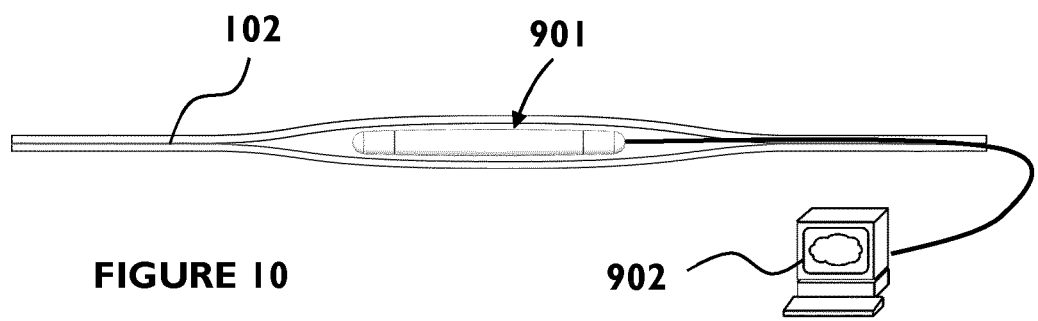
FIG. 10 illustrates the alternative sensor assembly of FIG. 9 located within the rope of the tethering assembly of FIG. 1.

It can be seen from a comparison of FIGS. 3 and 9 that sensor assembly 901 has a generally ellipsoidal shape that has a less pronounced curvature than that of the generally ellipsoidal shape of sensor assembly 301, looking more elongate and being closer to a cylindrical shape.

It is also to be understood that multiple sensor assemblies as described herein, each capable of wired and/or wireless communication, may be utilised within a system, such as an Internet of Things (IoT) system, to be monitored on-site and/or remotely via a web-based application, a desktop application, or a mobile application.

Figure 11:
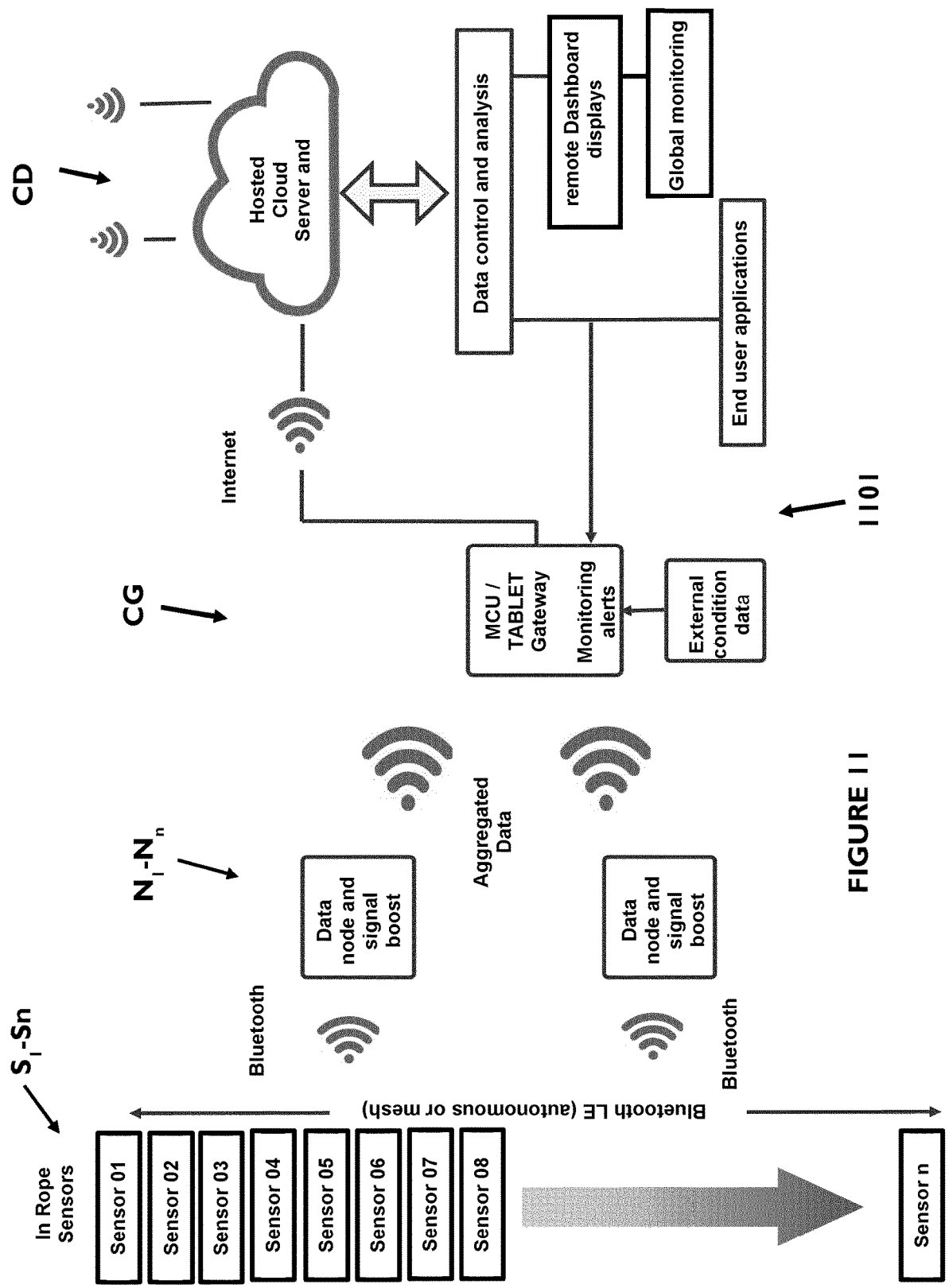
FIG. 11 illustrates features of an example sensor assembly network.

Referring now to FIG. 11, example sensor assembly network 1101 comprises a plurality of in-rope sensor assemblies $S_1$-$S_n$ and a plurality of nodes $N_1$-$N_n$ that are connected to form a mesh network, which provides at least two different communication pathways for data transfer to/from each sensor assembly $S_1$-$S_n$. This is advantageous in situations in which direct communication between a sensor assembly $S_1$-$S_n$ and a remote computer CD is impeded, for example by the physical presence of a fixed or movable structure (such as a building or a vessel) within the surroundings or by some other interference in the environment. A gateway module CG between the nodes $N_1$-$N_n$ and the remote computer CD is indicated. Data may be transferred, for example, from a sensor assembly to the remote computer via a repeater node and the gateway module.

Figure 12:
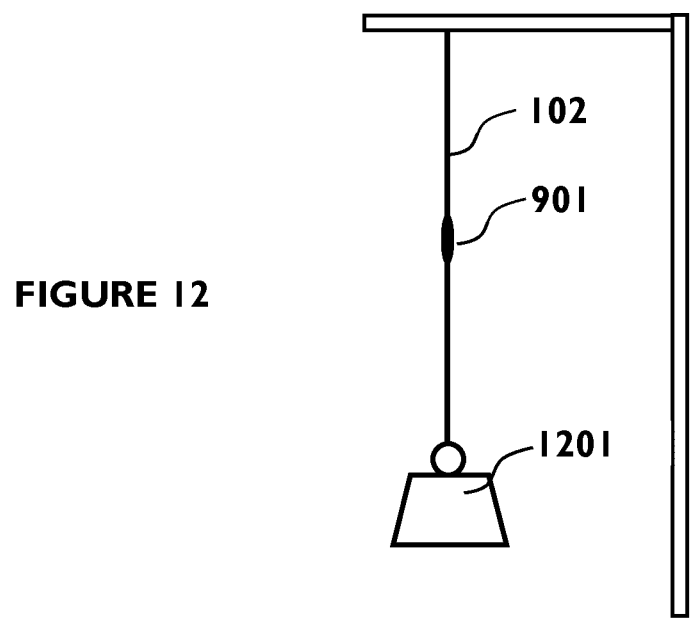
FIG. 12 illustrates use of the sensor assembly of FIG. 9 in use within a rope being used for lifting an object.

FIG. 12 shows sensor assembly 901 operatively positioned within rope 102, which is being used to lift an object 1201.

It is to be appreciated that variations on aspects illustrated and/or described with reference to the accompanying drawings may be utilised. For example, the housing may comprise any number of sections, which may be connected in any suitable manner, which would preferably involve the use of seals between sections, and the controller may be provided by any number of modules. The housing may be used to house other componentry. The housing may have any suitable dimensions.

Disclosed herein a rope tension sensor that comprises a multi-part housing configured to be inserted into the void of a fibre rope when the fibre rope is in a relaxed condition. In a preferred example, the housing approximates an ellipsoidal shape for smooth transition of the rope path around it. In a specific example, the housing has a length of approximately 180 mm and a maximum diameter of approximately 16 mm. The housing contains a battery, a load cell, and PCB control electronics with radio transmission antenna. A single force sensor is designed to measure strain induced by loads applied to the exterior of the housing as the rope itself is subject to varying tensile loads.

Data from multiple sensors may be communicated to, for example, a tablet PC, for storage and/or analysis. Load cells may be designed to fit within the same housing internal dimensions but have varying geometries and be constructed of different materials and positioned to make different points of contact. The load cells may utilise the same type of strain gauge with the same type of temperature compensation gauge. A sensor assembly as described herein may be configured to sense a magnitude of tension in a rope in the order of tonnes.

Although illustrative embodiments and examples of the invention have been disclosed in detail herein, with reference to the accompanying drawings, it is to be understood that the invention is not limited to the precise embodiment and examples shown and/or described and that various changes and modifications can be effected therein by one skilled in the art without departing from the scope of the invention as defined by the appended claims.

The invention claimed is:

1. A sensor assembly for sensing tension in a rope, the sensor assembly comprising: a housing, the housing defining an interior comprising inner walling, and in which at least a portion of the housing is resiliently deflectable, a force sensor for sensing a mechanical force applied to a resiliently deflectable portion of the housing, the force sensor located within the interior of the housing and non-fixedly held in contact with the inner walling in the region of the resiliently deflectable portion of the housing, and a controller for controlling the force sensor; wherein the force sensor is resiliently biased into contact with the inner walling by an adjustable chassis, the adjustable chassis located within the interior of the housing within the rope and the adjustable chassis configurable between extended and retracted conditions, and a span of the adjustable chassis, in a radial direction of the housing, being greater when in the extended condition than when in the retracted position, the retracted position allowing for insertion into the interior of the housing and the extended condition allowing for retention of the supported force sensor against the inner walling of the interior of the housing.

2. The sensor assembly of claim 1, the adjustable chassis comprises at least one movable engagement member that is resiliently biased towards an extended position for urging the force sensor into contact with the inner walling.

3. The sensor assembly of claim 1, the controller located within the interior of the housing.

4. The sensor assembly of claim 1, the force sensor comprising a strain gauge.

5. The sensor assembly of claim 4, the strain gauge extending in a circumferential direction of the housing.

6. The sensor assembly of claim 5, the strain gauge extending around one of: at least a quarter of an inner circumference of the interior of the housing, at least a half of an inner circumference of the interior of the housing, at least three-quarters of an inner circumference of the interior of the housing.

7. The sensor assembly of claim 1, further comprising a second force sensor, the controller for further controlling the second force sensor.

8. The sensor assembly of claim 7, the second force sensor comprising a strain gauge.

9. The sensor assembly of claim 1, further comprising a gyroscope sensor for measuring angular deviation from a reference line.

10. The sensor assembly of claim 9, wherein the gyroscope is a multi-axis gyroscope sensor.

11. The sensor assembly of claim 10, wherein the gyroscope sensor is a 6-axis gyroscope sensor.

12. The sensor assembly of claim 1, further comprising an antenna, the antenna located to extend within the interior of the housing.

13. The sensor assembly of claim 1, wherein the housing comprises a main body and a removable end cap.

14. The sensor assembly of claim 1, wherein the housing comprises a plastics material.

15. The sensor assembly of claim 1, wherein the housing comprises a metal material.

16. A tethering assembly for tethering an object, comprising:
- a rope, and
- a sensor assembly as claimed in claim 1, the sensor assembly located within the rope for sensing mechanical force applied to the housing by the rope.

17. A method of sensing tension in a rope, comprising:
obtaining a sensor assembly as claimed in claim 1,
locating the sensor assembly within the rope, and
operating the sensor assembly to sense tension in the rope.

* * * * *